(12) United States Patent
Vicars

(10) Patent No.: US 10,094,376 B1
(45) Date of Patent: Oct. 9, 2018

(54) DISCHARGE VALVE KEEPER AND PLUNGER COVER FOR HIGH PRESSURE PUMPS

(71) Applicant: Berton L. Vicars, Ruidoso, NM (US)

(72) Inventor: Berton L. Vicars, Ruidoso, NM (US)

(*) Notice: Subject to any disclaimer, the term of this patent is extended or adjusted under 35 U.S.C. 154(b) by 0 days.

(21) Appl. No.: 15/597,106

(22) Filed: May 16, 2017

Related U.S. Application Data

(63) Continuation-in-part of application No. 15/484,091, filed on Apr. 10, 2017.

(51) Int. Cl.
| | | |
|---|---|---|
| *F04B 53/22* | (2006.01) | |
| *F04B 53/16* | (2006.01) | |
| *F16J 15/04* | (2006.01) | |
| *F16K 27/02* | (2006.01) | |
| *F04B 7/00* | (2006.01) | |
| *F04B 53/00* | (2006.01) | |
| *F04B 39/12* | (2006.01) | |
| *F04B 53/10* | (2006.01) | |

(52) U.S. Cl.
CPC ............ *F04B 53/22* (2013.01); *F04B 7/0088* (2013.01); *F04B 39/121* (2013.01); *F04B 39/122* (2013.01); *F04B 39/125* (2013.01); *F04B 53/007* (2013.01); *F04B 53/10* (2013.01); *F04B 53/1032* (2013.01); *F04B 53/16* (2013.01); *F16J 15/04* (2013.01); *F16K 27/0209* (2013.01)

(58) Field of Classification Search
CPC ...... F04B 7/0088; F04B 7/0096; F04B 39/12; F04B 39/121; F04B 39/122; F04B 39/125; F04B 39/14; F04B 53/10; F04B 53/16; F04B 53/162; F04B 53/22; F04B 53/007; F04B 53/1032; F16K 27/0209; F16J 15/04

See application file for complete search history.

(56) References Cited

U.S. PATENT DOCUMENTS

| | | | | |
|---|---|---|---|---|
| 1,507,448 A | * | 9/1924 | Aldrich | ............... F16K 27/00 137/512 |
| 4,508,133 A | * | 4/1985 | Hamid | ............... E21B 33/13 137/68.22 |
| 4,520,837 A | * | 6/1985 | Cole | ............... E21B 33/13 137/68.23 |
| 6,695,007 B2 | | 2/2004 | Vicars | |
| 6,698,450 B2 | | 3/2004 | Vicars | |

(Continued)

*Primary Examiner* — Bryan Lettman
(74) *Attorney, Agent, or Firm* — Mark W Handley; Handley Law Firm, PLLC

(57) ABSTRACT

A fluid end (16) for a high pressure pump has suction and discharge covers (170) which are generally cylindrical-shaped and have annular-shaped recesses (190) which are formed to extend into the inner ends (174) of the covers (170). The recesses (190) provide expansion grooves which extend from the inner ends (174) to define flex regions (192) which are concentric with an outward peripheries (180) of the covers (170). The recesses (190) extend to positions intermediately disposed between seal grooves (166) and outer ends (176) of the covers (170). Stress relief portions (196) of the recesses (190) are located between the seal grooves (166) and the outer ends (176). High fluid pressures in the fluid end (16) expands the flex regions (192) of the covers (170) to press an adjacent portion of the outward peripheries (180) of the covers (170) into port walls to provide metal to metal seals.

20 Claims, 5 Drawing Sheets

(56) References Cited

U.S. PATENT DOCUMENTS

| | | | |
|---|---|---|---|
| 6,767,132 B2 | 7/2004 | Vicars | |
| 6,786,111 B2 | 9/2004 | Vicars | |
| 6,796,321 B2 | 9/2004 | Vicars | |
| 6,979,125 B2 | 12/2005 | Vicars | |
| 7,004,195 B2 | 2/2006 | Vicars | |
| 7,172,175 B2 | 2/2007 | Vicars | |
| 7,335,002 B2 | 2/2008 | Vicars | |
| 7,341,435 B2 | 3/2008 | Vicars | |
| 7,857,517 B1 | 12/2010 | Vicars | |
| 7,891,374 B2 | 2/2011 | Vicars | |
| 7,895,919 B2 | 3/2011 | Vicars | |
| 7,909,057 B1 | 3/2011 | Vicars | |
| 7,950,322 B2 | 5/2011 | Vicars | |
| 8,584,700 B2 | 11/2013 | Vicars | |
| 8,998,593 B2 | 4/2015 | Vicars | |
| 2004/0234404 A1 * | 11/2004 | Vicars | F04B 53/102 417/571 |
| 2008/0138224 A1 | 6/2008 | Vicars | |
| 2010/0288959 A1 | 11/2010 | Vicars | |
| 2011/0189040 A1 | 8/2011 | Vicars | |

* cited by examiner

DISCHARGE VALVE KEEPER AND PLUNGER COVER FOR HIGH PRESSURE PUMPS

CROSS-REFERENCE TO RELATED APPLICATION

The present application claims priority as a continuation-in-part to U.S. patent application Ser. No. 15/484,091, filed Apr. 10, 2017, entitled "Fluid End Valve for a High Pressure Pump" and invented by Berton L. Vicars.

TECHNICAL FIELD OF THE INVENTION

The present invention relates in general to high pressure pumps, and in particular to high pressure pumps used for fracturing formations in oil and gas production.

BACKGROUND OF THE INVENTION

Oil and gas well completion and production techniques often include hydraulic fracturing in low permeability rock formations to produce hydrocarbons, such as in shale and chalk rock formations. Hydraulic fracturing, often abbreviated "Frac," is a technique in which high hydraulic pressures often in excess of 20,000 pounds per square inch on the surface are used for opening channels in rock formations through which hydrocarbons can flow to production wells. During hydraulic fracturing, a fluid is pumped into a reservoir rock under high pressure where it cracks or fractures the rock. Treatment chemicals and solids called proppants are carried in suspension by the fluid pumped into the fractures. When the pressure is released, the fractures close on the proppants leaving open channels through which hydrocarbons can flow.

Specialized pumps are used to deliver fracturing fluids at sufficiently high rates of pressure to complete the hydraulic fracturing procedure, often called a "Frac job." These pumps are often called Frac pumps and typically have a drive end and a fluid end. The drive ends include motors which provide power. Fluid ends for current modern day Frac pumps bear a resemblance to automotive engine blocks. The fluid ends have pump chambers into which plungers are pushed, powered by the drive ends, to place the frac fluids under high pressures and move the frac fluids through the pump chambers. Current Frac pumps are typically classified as either triplex pumps or quintuplex type pumps. The triplex Frac pumps have three fluid passages extending transversely through a fluid end and three plungers which reciprocate to pressurize and move the Frac fluids through respective flow passages. Quintuplex Frac pumps have five fluid passages extending transversely through a fluid end and five plungers extending into respective ones of the flow passages for pressurizing and moving fluids through the respective flow passages. Triplex and quintuplex Frac pumps will typically have power ends which are powered by engines often rated from 2,000 horsepower to 3,000 horsepower, connected to the power ends by torque converters and transmissions.

The fluid ends of high pressure pumps have valves that control the flow of fluids to and from the plungers. Suction valves pass fluid into a respective flow passage when a respective plunger is moved outward from within a fluid end and seal against fluid flow when the plunger is moved inward into the fluid end. Suction valves are kept closed by springs until retraction of plunger and charge pump pressure cause suction valves to open. Discharge valves are configured to seal respective flow passages and not pass fluid when a plunger is moved outward from within a fluid end, and pass fluid through a discharge port when the plunger is pressed inward into the fluid end. Discharge pressure in the treating line and valve springs on discharge valves keep discharge valves closed until forward motion of the plunger builds pressure, forcing suction valves to close and discharge valves to open. Pressure buildup in fluid end chambers is greater than in treating lines causing the discharge valves to open, forcing fluid into the discharge line.

Power ends transmit torque from engines into reciprocating motion for moving pump plungers to power the fluid ends of conventional frac pumps. One or more pinion gears are mounted to a drive shaft extending from an engine transmission into a housing for the power end. The pinion gears engage ring gears to turn a crank shaft to which bearing housings with mating connecting rods are mounted. The connecting rods move crossheads and extension rods which are connected to pump plungers. The plungers are reciprocated in a pump chamber to move fluid through the fluid end pump.

Fluid ends and power ends have many parts that are releasably fastened to one another so that components may be easily repaired or replaced. Frac pump fluid end and power end components are often replaced at regular scheduled maintenance intervals to prevent failure and costly down time during fracturing operations. Improvements which increase the service life of Frac pump fluid end and power end components are highly desired.

Suction and discharge covers for fluids ends are cylindrically shaped plugs which provide access for replacing fluid end valves and plunger components. Elastomeric seals, such as O'rings, seal between the covers and the walls of ports in which the covered are disposed. Under high pressure these elastomeric seals will often leak.

SUMMARY OF THE INVENTION

Suction and discharge covers for use in fluid ends of high pressure pumps are disclosed. The high pressure pumps have fluid ends which include a suction passage, a discharge passage and a plunger passage defining fluid end ports. The suction and discharge covers have a cover body which includes an inner end, an outer end, and a central section disposed between the inner end and the outer end. The central section has a generally cylindrical-shaped outward periphery. The cover body has a central axis defined to extend concentric with the cylindrical-shaped outward periphery. An annular-shaped flange is located adjacent to the outer end and concentric with the central axis. The annular-shaped flange extends radially outward from the outward periphery of the central section. A first seal groove is formed to circumferentially extend into the outward periphery, adjacent to the annular-shaped flange. A second seal groove is formed into the outward periphery of the central section, intermediate between the outer end and the inner end, and spaced apart from the first seal groove, wherein when the cover body is located in position within one of the fluid end ports, a wall of the fluid end port and the first ands second seal grooves define seal glands.

An annular-shaped expansion groove is formed to extend into the inner end of the cover body, extending circumferentially around the central axis and spaced apart from the outward periphery of the central section. The expansion groove extends from the inner end toward the outer end to a flex region which is concentric with the central axis and the outward periphery of the central section. The expansion groove extends to positions intermediately disposed between a first plane of the second seal groove and a second plane of the outer end. Fluid pressure in the pump chamber of the fluid end expands outward the flex region of the cover body to press an adjacent portion of said outward periphery of the central section into the wall of the port in which the cover body is located, providing a metal to metal seal. A stress relief portion of the annular-shaped expansion groove is located in the flex region and intermediately disposed between the second seal groove and the first seal groove.

DESCRIPTION OF THE DRAWINGS

For a more complete understanding of the present invention and the advantages thereof, reference is now made to the following description taken in conjunction with the accompanying Drawings in which

FIG. 1 is a perspective view of a high pressure pump such as that typically used in Frac jobs;

FIG. 2 is a longitudinal section view of the high pressure pump of FIG. 1, taken along section line 2-2 of FIG. 1

FIG. 3 is a section view of a fluid end for the high pressure pump of FIG. 5, taken along section lines 2-2 of FIG. 1;

FIG. 4 is a longitudinal section view of a prior art plunger cover;

FIG. 5 is a longitudinal section view of a first plunger cover;

FIG. 6 is a longitudinal section view of a second plunger cover;

FIG. 7 is a longitudinal section view of a third plunger cover;

FIG. 8 is a longitudinal section view of a prior art valve keeper cover;

FIG. 9 is a longitudinal section view of a first discharge valve keeper;

FIG. 10 is a longitudinal section view of a second discharge valve keeper; and

FIG. 11 is a longitudinal section view of a third discharge valve keeper.

DETAILED DESCRIPTION OF THE INVENTION

Figure 1:
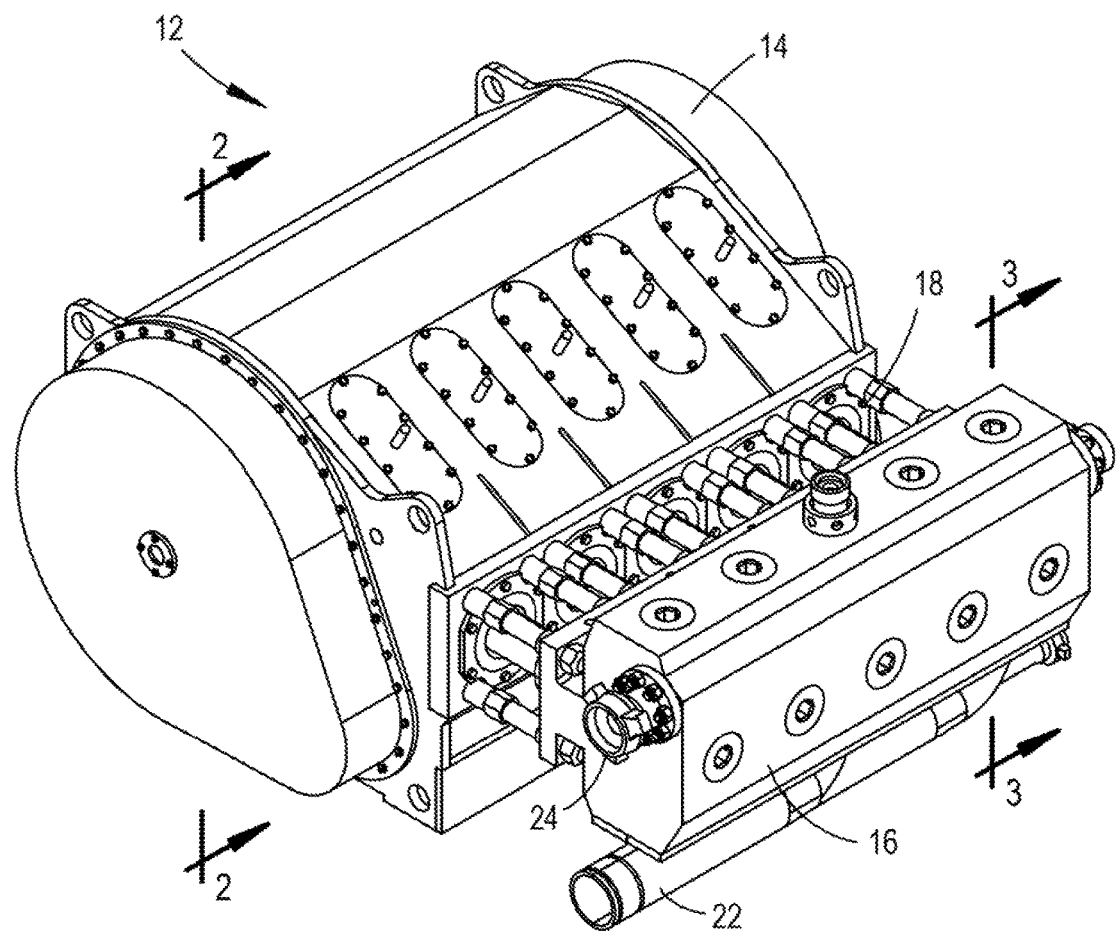
FIGS. 1 through 11 show various aspects of suction and discharge valve covers for a Frac pump made according to the present invention, as set forth below.

FIG. 1 is a perspective view of a high pressure plunger pump 12 such as that typically used in Frac jobs. Pump 12 is a quintuplex Frac pump having a power end 14 and a fluid end 16. Stay rods 18 secure the fluid end 16 to the power end 14. The fluid end 16 is a quintuplex fluid end, having five fluid passages which extend between a suction manifold 22 and a discharge manifold 24. The power end 14 has a crankshaft 36 with five connecting rods 38 and crossheads 40 for reciprocating five pump plungers 50 (shown in FIG. 2) to move fluid through the fluid end 16.

Figure 2:
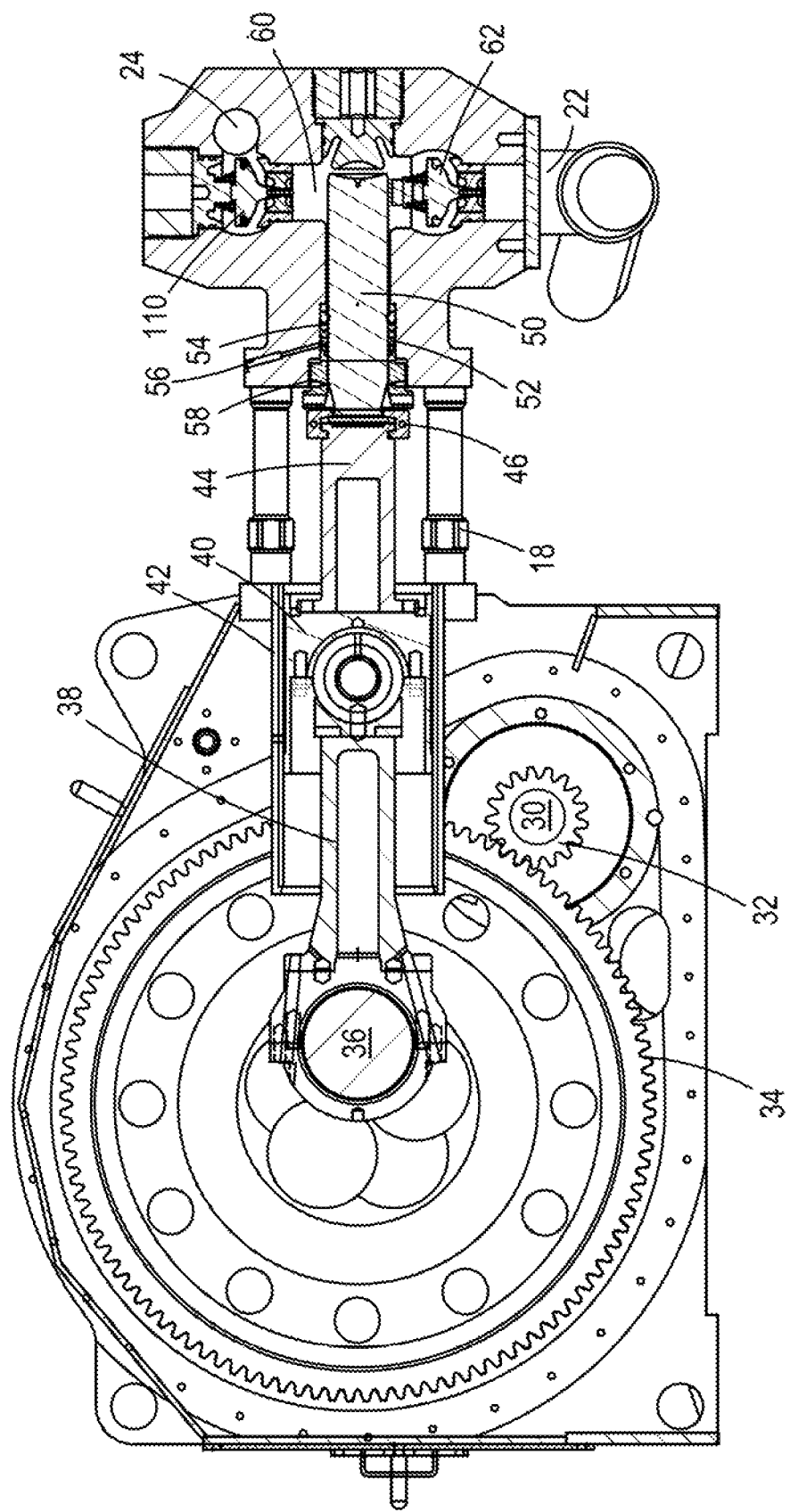

FIG. 2 is a longitudinal section view of the high pressure pump 12, taken along section lines 2-2 of FIG. 1, and shows the crankshaft 36, one of the connecting rods 38 and one of the crossheads 40. A crosshead extension 42 connects between the crosshead 40 and one the pump plungers 50. The plunger 50 extends into a pump chamber 60 which connects between a suction manifold 22 and a discharge manifold 24. A suction valve 62 separates the suction manifold 22 from the pump chamber 60, and a discharge valve 110 separates the pump chamber 60 from the discharge manifold 110. A drive shaft 30 is connected on one end to an engine (not shown) and on a second end to pinion gears 32 (one shown). The pinion gears 32 are connected to drive gears 34 (one shown) which are mounted to the crankshaft 36. Rotating the drive shaft 30 will rotate the crankshaft 36 which moves the connecting rods 38 and reciprocates the crosshead 40 within the crosshead sleeve 42. A crosshead extension 44 connects between the crosshead 40 and the plunger 50, reciprocating the plunger 50 in the pump chamber 60 to pump fluid through the fluid end 16. Moving the plunger outward from the pump chamber 60 closes the discharge valve 110 and draws fluid from the suction manifold 22, through suction valve 62 and into the pump chamber 60. Stroking the plunger 50 into the pump chamber 60 closes the suction valve 62 and pushes fluid from the pump chamber 60 through the discharge valve 110 and into the discharge manifold 24.

Figure 3:
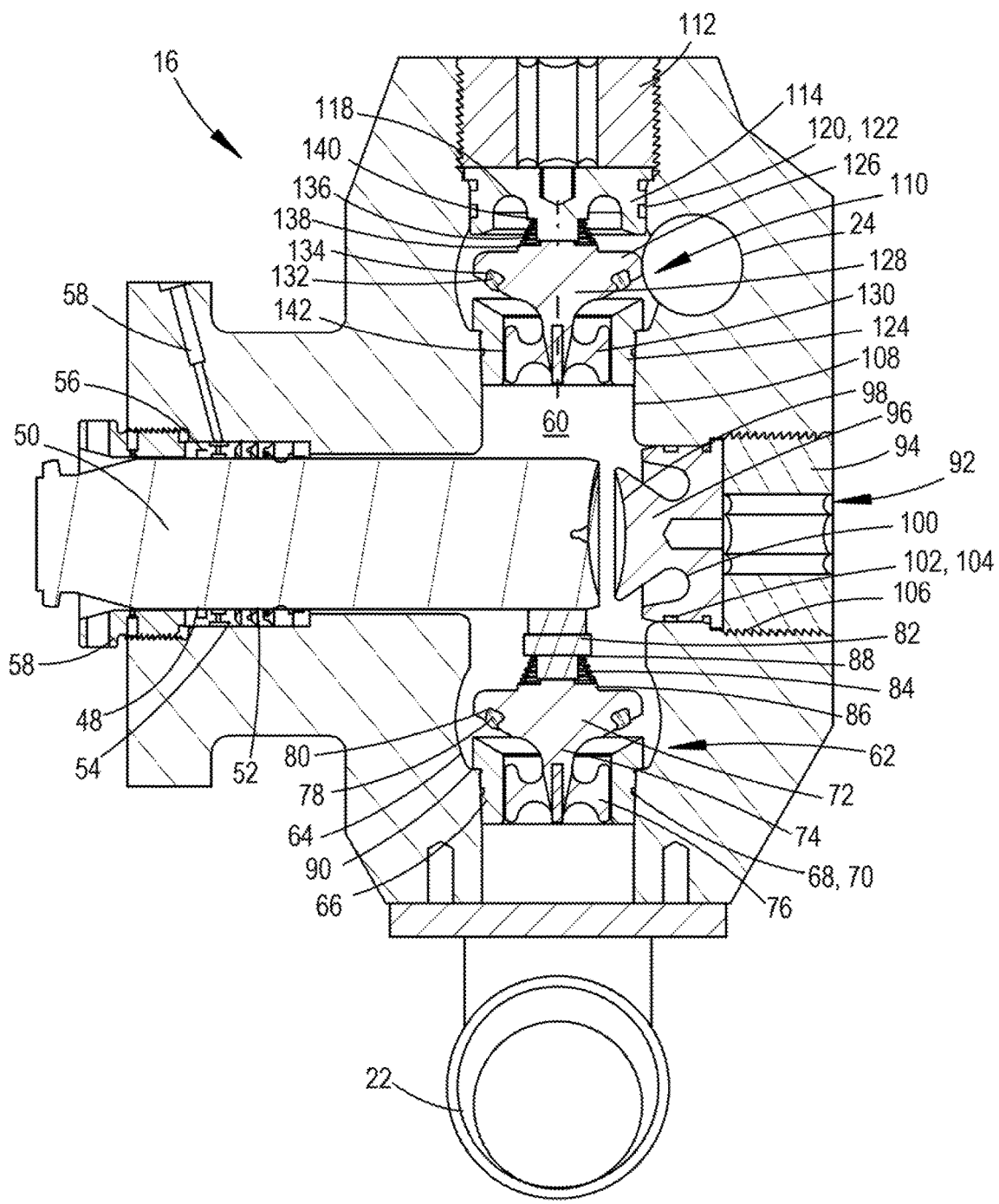

FIG. 3 is a section view of the fluid end 16, taken along section lines 3-3 of FIG. 1. The plunger 50 extends into the fluid end 16 through a stuffing box 52 and packing nut 58. Packing 54 seals between the plunger 50 and the body of the fluid end 50. A lubricator port 56 extends from an exterior of the fluid end 16 into the stuffing box 52.

A suction valve 62 is disposed within a suction passage 64. An annular-shape shoulder 90 is formed into the suction passage 64 and retains the suction valve seat 66 in a first position in the suction passage 64. The suction valve 62 includes the suction valve seat 66 and a suction valve piston 72. A seal 68 and seal gland 70 circumferentially extend around an exterior of the valve seat 66. The suction valve piston 72 has a valve stem 74 and guides 76 which extend radially outward from the valve guide stem 74. The valve stem 74 and the guides 76 together define a guide element for centering the suction valve piston 72 within the valve seat 66. A seal 78 and seal gland 80 are provided on the lower end or downwardly facing surface of the suction valve piston 72. A suction valve keeper 82 and bias spring 84 are disposed above the suction valve piston 72, with a valve spring seat 86 and a rear spring seat 88 securing the bias spring 84 above the piston 72.

A plunger keeper assembly 92 is disposed within a keeper passage 106 disposed adjacent to the plunger passage 48. The plunger keeper passage 106 is preferably in registration with the plunger passage 48, disposed on opposite sides of the pump chamber 60. A plunger retainer 94 secures a plunger cover 96 within the keeper passage 106. The plunger cover 96 has a cover face 98 which is disposed in registration with a terminal longitudinal end of the plunger 50. Seal glands 102 and seals 104 (not shown) extend circumferentially around an exterior periphery of the plunger cover 96. A cover recess 100 defines an annular-shaped expansion groove which extends into the plunger cover 96 and circumferentially extends around the cover face 98. The cover recess 100 is a groove formed into an end face of the plunger cover 96 and extending circumferentially around the plunger cover 96, such that fluid pressure will press against the sidewalls of the recess 100 to urge the seals 104 to engage against a surface of the plunger keeper passage 106 to seal at the high pressures at which frac pumps are operated.

A discharge valve 110 is disposed within the discharge passage 108 for selectively sealing the discharge passage 108. A discharge valve retainer 112 is threadingly secured within an outward end of the discharge passage 108 for retaining a discharge valve keeper 114 and the discharge valve 110 within the discharge flow passage 108. The discharge valve keeper 114 has a circumferentially extending recess 118 formed into a downward-facing end of the keeper 114 to define an annular-shaped expansion groove.

Seal glands 120 and seals 122 (not shown) extend circumferentially around the exterior of the valve keeper 114. The keeper recess 118 is acted upon by fluid pressure to flex the exterior circumference of the valve keeper 114 against the surface of the discharge passage 108, engaging the seals 122 (not shown) against the surface of the discharge passage 108. The discharge valve 110 includes a discharge valve seat 124 and a discharge valve piston 126. The valve piston 126 is moveably disposed within the discharge valve seat 124. The valve piston 126 includes a guide stem 128 with radially outward extending guides 130 for engaging against the surface of a flow passage 142 extending through the valve seat 124. A seal element 132 is disposed within a seal gland groove 134 which is formed into a downward facing surface of the valve piston 126 for engaging against the discharge valve seat 124. A discharge valve spring 136 extends between the valve keeper 114 and an upper end of the valve piston 126, retained by a discharge valve spring seat 138 and a keeper spring seat 140 as retained in position.

Figure 4:
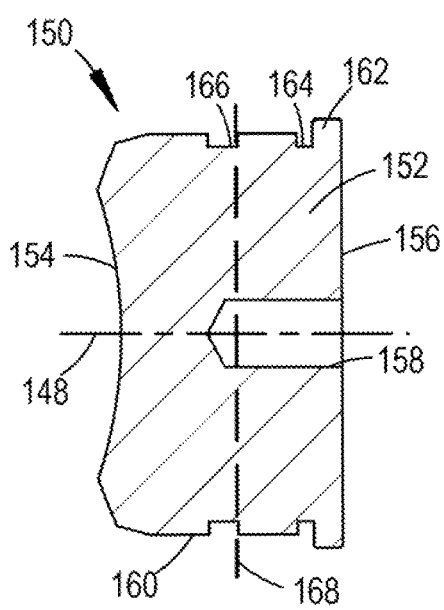

FIG. 4 is a longitudinal section view of a prior art cover 150. The cover 150 has a cylindrical-shaped body 152 defining a plug for fitting in a port defined by the plunger keeper cover passage 106. The body 152 is concentrically disposed around a central axis 148 and has an inner end 154 defining an inward face, and an outer end 156. A threaded blind hole 158 is formed into the face of the outer end 156. An annular-shaped protrusion defines a flange 162. A first seal groove 164 and a second seal groove 166 are formed into the outer periphery of the body 152, spaced apart with the second seal groove 166 disposed inward of the first seal groove 164. The first seal groove 164 is disposed adjacent the flange 162. The first seal groove 164 and the second seal groove 166 are concentric with the central axis 148, with a plane 168 defining an outward edge of the second seal groove 166 disposed perpendicular to the central axis 148.

Figure 5:
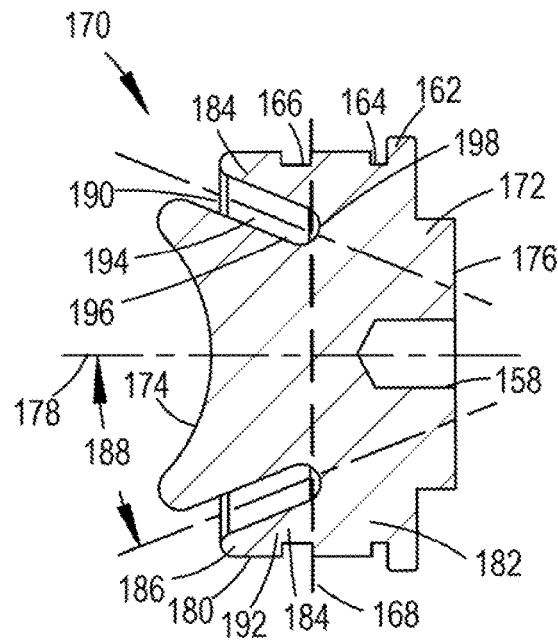

FIG. 5 is a longitudinal section view of a plunger cover 170 having a cylindrical-shaped body 172 defining a plug for fitting in a port defined by the plunger keeper cover passage 106. The body 172 is concentrically disposed around the central axis 178 and has an inner end 174 defining an inward face, an outer end 176, and a central axis 178. A central section 182 has an outer periphery 180, disposed between the inner end 174 and the outer end 176, concentrically disposed with the central axis 182. A threaded blind hole 158 is formed into the face of the outer end 176, concentrically disposed with the central axis 182. A annular-shaped protrusion defines a flange 162. A first seal groove 164 and a second seal groove 166 are formed into the outer periphery of the body 172, spaced apart with the second seal groove 166 disposed inward of the second seal groove 164. The first groove 164 is disposed adjacent the flange 162. The first groove 164 and the second groove 166 are concentric with the central axis 148, with a plane 168 defining an outward edge of the second groove 166 disposed perpendicular to the central axis 178.

A recess 190 is formed into the end portion 186 adjacent the inner end face 174 of cylindrically-shaped body 172 of the cover 170 to define an annular-shaped expansion groove which is concentric with the central axis 178. The annular-shaped recess 190 has a radially outermost profile which is also frustoconically shaped and has a central annular-shaped projection which extends into the body 172 preferably at a twenty-two degree angle 188 to the central axis 178, defining an inner surface of an outer wall 184, which is also annular-shaped. The recess 190 defines a flex region 192 for fluid pressure from the pump chamber 60 to expand an outer annular-shaped wall 184 of the cover 170 outward to press a seal disposed within the seal groove 166 into the wall of the port defined by the plunger keeper cover passage 106. Under high pressures, the outer wall 184 will press into the wall of the port to provide a metal-to-metal seal. The recess 190 has a fluid communication portion 194 and a stress relief portion 196. The fluid communication portion 194 applies fluid pressures within the pump chamber 60 to the inward side of the annular shaped wall 184, expanding the wall 184 radially outward. The stress relief portion 196 defines a terminal end wall 198 of the recess 190 which is concave in shape to prevent stress concentrations during pressure cycling from pressures changing within the pump chamber 60. The recess 190 extends from the inner end 174 and the end portion 186 toward the outer end 176, to a position which is located beyond the plane 168, such that the terminal end wall 198 is disposed in an intermediate position between the first seal groove 164 and the second seal groove 166, relative to radial projections from the central axis 178 to respective ones of the first seal groove 164 and the second seal groove 166. Preferably, the stress relief portion 196 is disposed outward of the plane 168.

Figure 6:
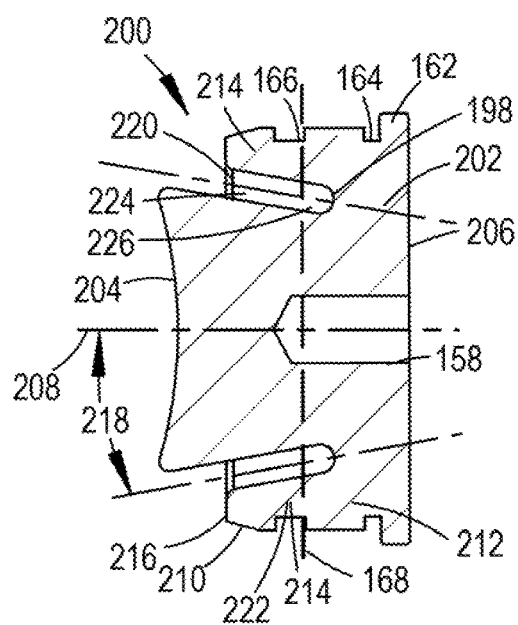

FIG. 6 is a longitudinal section view of a plunger cover 200 having a body 202 defining a plug for fitting in a port defined by the plunger keeper cover passage 106. The body 202 is concentrically disposed around the central axis 148 and has an inner end 204 defining an inward face, an outer end 206, and a central axis 208. A central section 212 has an outer periphery 210, disposed between the inner end 204 and the outer end 206, concentrically disposed with the central axis 208. A threaded blind hole 158 is formed into the face of the outer end 176, concentrically disposed with the central axis 208. A annular-shaped protrusion defines a flange 162. A first seal groove 164 and a second seal groove 166 are formed into the outer periphery of the body 172, spaced apart with the second seal groove 166 disposed inward of the firs seal groove 164. The first seal groove 164 is disposed adjacent the flange 162. The first seal groove 164 and the second seal groove 166 are disposed concentric with the central axis 208, with a plane 168 defining an outward edge of the second seal groove 166 disposed perpendicular to the central axis 208.

A recess 220 is formed into an end portion 216 adjacent the inner end face 204 of cylindrically-shaped body 202 of the cover 200 to define an annular-shaped expansion groove which is concentric with the central axis 208. The annular-shaped recess 220 has a radially outermost profile which is also frustoconically shaped and has a central annular-shaped projection which extends into the body 202 at an angle 218 to the central axis 208, defining an inner surface of an outer wall 214, which is also annular-shaped. The recess 220 defines a flex region 222 for fluid pressure from the pump chamber 60 to expand an outer annular-shaped wall 214 of the cover 200 outward to press a seal disposed within the seal groove 166 into the wall of the port defined by the plunger keeper cover passage 106. Under high pressures, the outer wall 214 will press into the wall of the port to provide a metal-to-metal seal. The recess 220 has a fluid communication portion 224 and a stress relief portion 226. The fluid communication portion 224 applies fluid pressures within the pump chamber 60 to the inward side of the annular shaped wall 214, expanding the wall 214 radially outward. The stress relief portion 226 defines a terminal end wall 228 of the recess 220 which is concave in shape to prevent stress concentrations during pressure cycling from pressures changing within the pump chamber 60. The recess 220 extends from the inner end 204 and the end portion 216 toward the outer end 206, to a position which is located beyond the plane 168, such that the terminal end wall 228 is disposed in an intermediate position between the second seal groove 164 and the first seal groove 166, relative to radial projections from the central axis 208 to respective ones of first seal groove 164 and the second seal groove 166. Preferably, the stress relief portion 226 is disposed outward of the plane 168.

Figure 7:
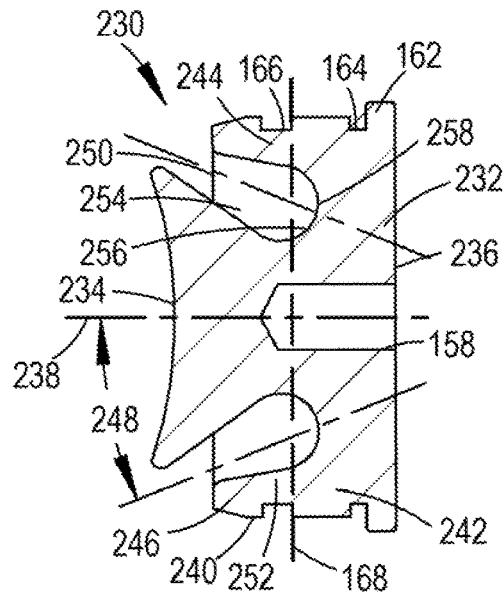

FIG. 7 is a longitudinal section view of a plunger cover 230 having a cylindrical-shaped body 232 defining a plug for fitting in a port defined by the plunger keeper cover passage 106. The body 232 is concentrically disposed around the central axis 238 and has an inner end 234 defining an inward face, an outer end 236, and a central axis 238. A central section 242 has an outer periphery 240, disposed between the inner end 234 and the outer end 236, concentrically disposed with the central axis 242. A threaded blind hole 158 is formed into the face of the outer end 236, concentrically disposed with the central axis 238. An annular-shaped protrusion defines a flange 162. A first seal groove 164 and a second seal groove 166 are formed into the outer periphery of the body 232, spaced apart with the second seal groove 166 disposed inward of the first seal groove 164. The first seal groove 164 is disposed adjacent the flange 162. The first seal groove 164 and the second seal groove 166 are concentric with the central axis 238, with a plane 168 defining an outward edge of the second seal groove 166 disposed perpendicular to the central axis 238.

A recess 250 is formed into an end portion 246 adjacent the inner end face 234 of cylindrically-shaped body 232 of the cover 230 to define an annular-shaped expansion groove which is concentric with the central axis 238. The annular-shaped recess 250 has a radially outermost profile which is also of a general frustoconical shaped and has a central annular-shaped projection which extends into the body 232 preferably at a twenty-two degree angle 248 to the central axis 238, defining an inner surface of an outer wall 244, which is also annular-shaped. The recess 250 defines a flex region 252 for fluid pressure from the pump chamber 60 to expand outward an outer annular-shaped wall 244 of the cover 230 to press a seal disposed within the seal groove 166 into the wall of the port defined by the plunger keeper cover passage 106. Under high pressures, the outer wall 244 will press into the wall of the port to provide a metal-to-metal seal. The recess 250 has a fluid communication portion 254 and a stress relief portion 256. The fluid communication portion 254 applies fluid pressures within the pump chamber 60 to the inward side of the annular shaped wall 244, expanding the wall 244 radially outward. The stress relief portion 256 defines a terminal end wall 258 of the recess 250 which is concave in shape to prevent stress concentrations during pressure cycling from pressures changing within the pump chamber 60. The recess 250 extends from the inner end 234 and the end portion 246 toward the outer end 236, to a position which is located beyond the plane 168, such that the terminal end wall 258 is disposed in an intermediate position between the first seal groove 164 and the second seal groove 166, relative to radial projections from the central axis 238 to respective ones of first seal groove 164 and the second seal groove 166. Preferably, the stress relief portion 256 is disposed outward of the plane 168.

Figure 8:
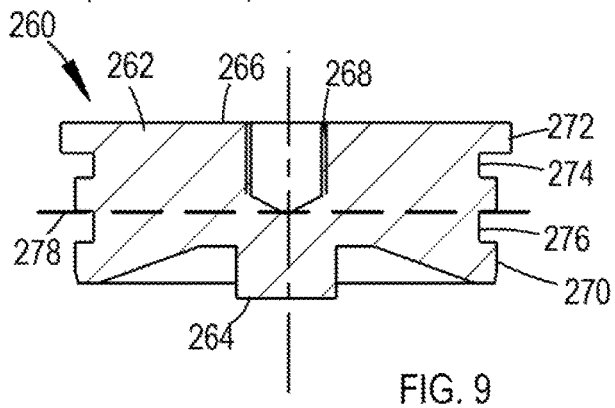

FIG. 8 is a longitudinal section view of a prior art cover 260. The cover 260 has a cylindrical-shaped body 262 defining a plug for fitting in a port defined by the plunger keeper passage 106. The body 262 is concentrically disposed around a central axis 148 and has an inner end 264 defining an inward face, and an outer end 266. A threaded blind hole 268 is formed into the face of the outer end 266. An annular-shaped protrusion defines a flange 272. A first seal groove 274 and a second seal groove 276 are formed into the outer periphery of the body 262, spaced apart with the second seal groove 276 disposed inward of the first seal groove 274. The first seal groove 274 is disposed adjacent the flange 272. The first seal groove 274 and the second seal groove 276 are concentric with the central axis 148, with a plane 278 defining an outward edge of the second seal groove 276 disposed perpendicular to the central axis 148.

Figure 9:
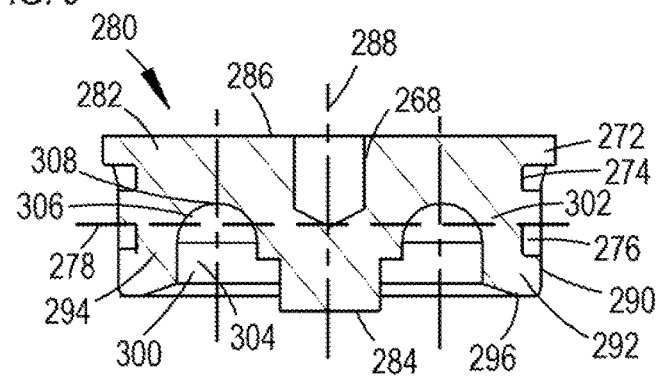

FIG. 9 is a longitudinal section view of a discharge valve keeper 280 having a cylindrical-shaped body 282 defining a plug for fitting in a port defined by the plunger keeper cover passage 106. The body 282 is concentrically disposed around the central axis 288 and has an inner end 284 defining an inward face, an outer end 286, and a central axis 288. A central section 292 has an outer periphery 290, disposed between the inner end 284 and the outer end 286, concentrically disposed with the central axis 288. A threaded blind hole 268 is formed into the face of the outer end 286, concentrically disposed with the central axis 288. An annular-shaped protrusion defines a flange 272. A first seal groove 274 and a second seal groove 276 are formed into a central section 292 of an outer periphery 290 of the body 282, spaced apart with the second seal groove 276 disposed inward of the first seal groove 274. The first seal groove 274 is disposed adjacent the flange 272. The first seal groove 274 and the second seal groove 276 are concentric with the central axis 288, with a plane 278 defining an outward edge of the seal groove 166 disposed perpendicular to the central axis 288.

A recess 300 is formed into an end portion 296 adjacent the inner end face 284 of cylindrically-shaped body 282 of the cover 280 to define an annular-shaped expansion groove which is concentric with the central axis 288. The recess 300 is annular shaped and extends into the body 312 to define an inner surface of an outer wall 324, which is also annular-shaped. The recess 300 defines a flex region 302 for fluid pressure from the pump chamber 60 to expand outward an outer annular-shaped wall 294 of the cover 280 to press a seal disposed within the seal groove 166 into the wall of the port defined by the plunger keeper cover passage 106. Under high pressures, the outer wall 294 will press into the wall of the port to provide a metal-to-metal seal. The recess 300 has a fluid communication portion 304 and a stress relief portion 306. The fluid communication portion 304 applies fluid pressures within the pump chamber 60 to the inward side of the annular shaped wall 294, expanding the wall 294 radially outward. The stress relief portion 306 defines a terminal end wall 308 of the recess 300 which is concave in shape to prevent stress concentrations during pressure cycling from pressures changing within the pump chamber 60. The recess 300 extends from the inner end 284 and the end portion 296 toward the outer end 286, to a position which is located beyond the plane 278, such that the terminal end wall 308 is disposed in an intermediate position between the first seal groove 274 and the second seal groove 276, relative to radial projections from the central axis 288 to respective ones of first seal groove 274 and the second seal groove 276. Preferably, the stress relief portion 306 is disposed outward of the plane 278.

Figure 10:
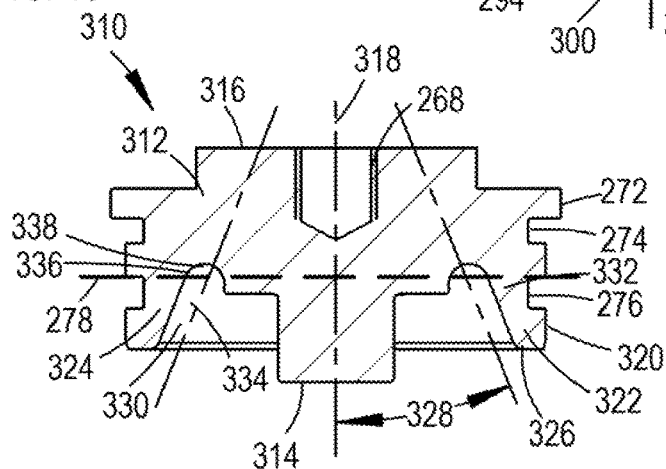

FIG. 10 is a longitudinal section view of a discharge valve keeper 310 having a cylindrical-shaped body 312 defining a plug for fitting in a port defined by the plunger keeper cover passage 106. The body 312 is concentrically disposed around the central axis 318 and has an inner end 314 defining an inward face, an outer end 316, and a central axis 318. A central section 322 has an outer periphery 320, disposed between the inner end 314 and the outer end 316, concentrically disposed with the central axis 318. A threaded blind hole 268 is formed into the outer end 316, concentrically disposed with the central axis 318. A annular-shaped protrusion defines a flange 272. A first seal groove 274 and a second seal groove 276 are formed into the outer periphery 320 of a central section 322 of the body 312, spaced apart with the second seal groove 276 disposed inward of the first seal groove 274. The first seal groove 164 is disposed adjacent the flange 272. The first seal groove 274 and the second seal groove 276 are concentric with the central axis 318, with a plane 278 defining an outward edge of the second seal groove 276 disposed perpendicular to the central axis 318.

A recess 330 is formed into an end portion 326 adjacent the inner end face 314 of cylindrically-shaped body 312 of the cover 310 to define an annular-shaped expansion groove which is concentric with the central axis 318. The annular-shaped recess 330 has a radially outermost profile which is also frustoconically shaped and has a central annular-shaped projection which extends into the body 312 preferably at a twenty-two degree angle 328 to the central axis 352, defining an inner surface of an outer wall 324, which is also annular-shaped. The recess 330 defines a flex region 332 for fluid pressure from the pump chamber 60 to expand outward an outer wall 324 of the cover 310 to press a seal disposed within the seal groove 166 into the wall of the port defined by the plunger keeper cover passage 106. Under high pressures, the outer wall 324 will press into the wall of the port to provide a metal-to-metal seal. The recess 330 has a fluid communication portion 334 and a stress relief portion 336. The fluid communication portion 334 applies fluid pressures within the pump chamber 60 to the inward side of the annular shaped wall 324, expanding the wall 324 radially outward. The stress relief portion 336 defines a terminal end wall 338 of the recess 330 which is concave in shape to prevent stress concentrations during pressure cycling from pressures changing within the pump chamber 60. The recess 330 extends from the end portion 326 toward the outer end 316, to a position which is located beyond the plane 278. The terminal end wall 338 is disposed in an intermediate position between the first seal groove 274 and the second seal groove 276, relative to radial projections from the central axis 318 to respective ones of first groove 274 and the second seal groove 276. Preferably, the stress relief portion 336 is disposed outward of the plane 278.

Figure 11:
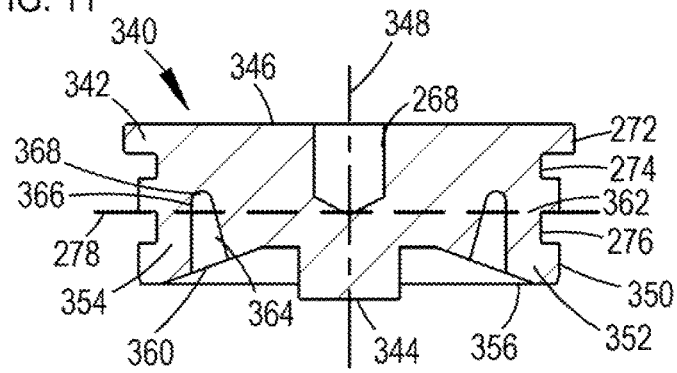

FIG. 11 is a longitudinal section view of a discharge valve keeper 340 having a body 342 defining a plug for fitting in a port defined by the plunger keeper cover passage 106. The body 342 is concentrically disposed around the central axis 148 and has an inner end 344 defining an inward face, an outer end 346, and a central axis 348. A central section 352 has an outer periphery 350, disposed between the inner end 344 and the outer end 346, concentrically disposed with the central axis 352. A threaded blind hole 268 is formed into the face of the outer end 346, concentrically disposed with the central axis 348. An annular-shaped protrusion defines a flange 272. A first seal groove 274 and a second seal groove 276 are formed into an outer periphery 350 of a central section 352 of the body 342, spaced apart with the second seal groove 276 disposed inward of the first seal groove 274. The first seal groove 274 is disposed adjacent the flange 272. The first seal groove 274 and the second seal groove 276 are concentric with the central axis 348, with a plane 278 defining an outward edge of the second seal groove 276 disposed perpendicular to the central axis 348.

A recess 360 is formed into an end portion 356 adjacent the inner end face 344 of cylindrically-shaped body 342 of the cover 340 to define an annular-shaped expansion groove which is concentric with the central axis 348. The annular-shaped recess 360 has a central annular-shaped projection which extends into the body 342, defining an interior surface of an outer wall 354. The recess 360 defines a flex region 362 for fluid pressure from the pump chamber 60 to expand outward the outer annular-shaped wall 354 of the cover 340 to press a seal disposed within the seal groove 166 into the wall of the port defined by the plunger keeper cover passage 106. Under high pressures, the outer wall 354 will press into the wall of the port to provide a metal-to-metal seal. The recess 360 has a fluid communication portion 364 and a stress relief portion 366. The fluid communication portion 364 applies fluid pressures within the pump chamber 60 to the inward side of the outer wall 354, which is annular-shaped, expanding the wall 354 radially outward. The stress relief portion 366 defines a terminal end wall 368 of the recess 360 which is concave in shape to prevent stress concentrations during pressure cycling from pressures changing within the pump chamber 60. The recess 360 extends from the inner end 344 and the end portion 456 toward the outer end 346, to a position which is located beyond the plane 278. The terminal end wall 368 is disposed in an intermediate between the first seal groove 274 and the second seal groove 276, relative to radial projections from the central axis 348 to respective ones of firs seal groove 274 and the second seal groove 276. Preferably, the stress relief portion 366 is disposed outward of the plane 168.

Typically carburized steel is used for making fluid end components which provides sufficient hardness for durability to withstand the high pressures of the operation of the fluid end 16 of the pump 12 and the abrasive materials carried in frac fluids being pumped.

The present disclosure provides a fluid end valve for high pressure pumps such as those used for fracing. The fluid end valve has a valve seat and a valve plunger, each having a respective seal surface. A seal element is provided to extend from a central portion of the plunger seal surface for engaging an intermediate section of the seat seal surface, with the plunger seal surface, the seat seal surface and the seal element extending continuously around a flow passage extending through the valve seat when the seal element is engaging the intermediate portion of the seat seal surface. The valve plunger has a guide stem from which extends five guide arms for engaging a flow passage through the valve seat.

Although the preferred embodiment has been described in detail, it should be understood that various changes, substitutions and alterations can be made therein without departing from the spirit and scope of the invention as defined by the appended claims.

What is claimed is:

1. A discharge valve keeper and plunger cover for use in a fluid end of a pump, the fluid end having a suction passage, a discharge passage and a plunger passage defining fluid end ports, with a plunger disposed in the plunger passage and a pump chamber, the discharge valve keeper located in a port of the discharge passage and the plunger cover located in a port on an opposite side of the pump chamber as the plunger passage comprising:

a cover body having an inner end, an outer end, and a central section disposed between said inner end and said outer end, said central section having a cylindrical-shaped outward periphery;

a seal groove formed into said outward periphery of said central section, intermediate between said outer end and said inner end, wherein when said cover body is disposed in position within one of the fluid end ports, a wall of the fluid end port and said seal groove define a seal gland; and an expansion groove formed into said inner end of said cover body, extending circumferentially within and spaced apart from said outward periphery of said central section, and extending from said inner end toward said outer end to a flex region which is concentric with said outward periphery of said central section and extends to positions intermediately disposed between said seal groove and said outer end, wherein fluid pressure in said pump chamber of said fluid end expands said flex region to press an adjacent portion of said outward periphery of central section into said wall of said port in which said cover body is disposed.

2. The discharge valve keeper and plunger cover for use in the fluid end of the pump according to claim 1, wherein said expansion groove has an outward end which defines a fluid communication portion for transmitting fluid pressure within said pump chamber to said flex region of said cover body.

3. The discharge valve keeper and plunger cover for use in the fluid end of the pump according to claim 2, wherein said expansion groove has an inward end which defines a stress relief portion which in a longitudinal section view has an arcuately shaped terminal end wall.

4. The discharge valve keeper and plunger cover for use in the fluid end of the pump according to claim 3, wherein said terminal end wall of said annular-shaped expansion groove is concave.

5. The discharge valve keeper and plunger cover for use in the fluid end of the pump according to claim 4, wherein said stress relief portion of said expansion groove is disposed in said flex region, and intermediate between said seal groove and said outer end.

6. The discharge valve keeper and plunger cover for use in the fluid end of the pump according to claim 1, wherein an outermost sidewall of said expansion groove annular-shaped and formed at a twenty-two degree angle to a central longitudinal axis of said cover body.

7. The discharge valve keeper and plunger cover for use in the fluid end of the pump according to claim 1, wherein said cover body is formed of carburized steel.

8. A discharge valve keeper and plunger cover for use in a fluid end of a pump, the fluid end having a suction passage, a discharge passage and a plunger passage defining fluid end ports, with a plunger disposed in the plunger passage and a pump chamber, and fluid end valves disposed in said suction passage and said discharge passage, the discharge valve keeper located in a port of the discharge passage and the plunger cover located in a port on an opposite side of the pump chamber as the plunger passage comprising:

a cover body having an inner end, an outer end, and a central section disposed between said inner end and said outer end, said central section having a cylindrical-shaped outward periphery, wherein said cover body has a central axis defined to extend concentric with said cylindrical-shaped outward periphery and concentrically through said inner end and said outer end;

an annular-shaped flange disposed adjacent to said outer end and concentric with said central axis, said annular-shaped flange extending radially outward from said outward periphery of said central section;

a first groove formed to circumferentially extend into said outward periphery, adjacent to said annular-shaped flange;

a second groove formed into said outward periphery of said central section, intermediate between said outer end and said inner end, and spaced apart from said first groove, wherein when said cover body is disposed in position within one of the fluid end ports, a wall of said fluid end port and said second groove define a seal gland; and an annular-shaped expansion groove formed into said inner end of said cover body, extending circumferentially around said central axis and spaced apart from said outward periphery of said central section, and extending from said inner end toward said outer end to a flex region which is concentric with said central axis and said outward periphery of said central section and extends to positions intermediately disposed between said second groove and said outer end, wherein fluid pressure in said pump chamber of said fluid end expands said flex region to press an adjacent portion of said outward periphery of said central section into said wall of said port in which said cover body is disposed.

9. The discharge valve keeper and plunger cover for use in the fluid end of the pump according to claim 8, wherein said annular-shaped expansion groove has an outward end which is annular-shaped and defines a fluid communication portion for transmitting fluid pressure within said pump chamber to said flex region of said cover body.

10. The discharge valve keeper and plunger cover for use in the fluid end of the pump according to claim 9, wherein said annular-shaped expansion groove has an inward end which is annular-shaped and defines a stress relief portion which in a section view along said central axis has an arcuately shaped terminal end wall.

11. The discharge valve keeper and plunger cover for use in the fluid end of the pump according to claim 10, wherein said terminal end wall of said annular-shaped expansion groove is concave.

12. The discharge valve keeper and plunger cover for use in the fluid end of the pump according to claim 11, wherein said stress relief portion of said annular-shaped expansion groove is disposed in said flex region, and intermediate between said second groove and said outer end.

13. The discharge valve keeper and plunger cover for use in the fluid end of the pump according to claim 8, wherein an outermost sidewall of said annular-shaped expansion groove is formed at a twenty-two degree angle to said central axis.

14. The discharge valve keeper and plunger cover for use in the fluid end of the pump according to claim 8, wherein said cover body is formed of carburized steel.

15. A discharge valve keeper and plunger cover for use in a fluid end of a pump, the fluid end having a suction passage, a discharge passage and a plunger passage defining fluid end ports, with a plunger disposed in the plunger passage and a pump chamber, and fluid end valves disposed in said suction passage and said discharge passage, the discharge valve keeper located in a port of the discharge passage and the plunger cover located in a port on an opposite side of the pump chamber as the plunger passage comprising:

a cover body having an inner end, an outer end, and a central section disposed between said inner end and said outer end, said central section having a cylindrical-shaped outward periphery, wherein said cover body has a central axis defined to extend concentric with said cylindrical-shaped outward periphery and concentrically through said inner end and said outer end;

an annular-shaped flange disposed adjacent to said outer end and concentric with said central axis, said annular-shaped flange extending radially outward from said outward periphery of said central section;

a first seal groove formed to circumferentially extend into said outward periphery, adjacent to said annular-shaped flange;

a second seal groove formed into said outward periphery of said central section, intermediate between said outer end and said inner end, and spaced apart from said first seal groove, wherein when said cover body is disposed in position within one of the fluid end ports, a wall of said fluid end port and said second seal groove define a seal gland; and an annular-shaped expansion groove formed into said inner end of said cover body, extending circumferentially around said central axis and spaced apart from said outward periphery of said central section, and extending from said inner end toward said outer end to a flex region which is concentric with said central axis and said outward periphery of said central section and extends to positions intermediately disposed between said second seal groove and said outer end, wherein fluid pressure in said pump chamber of said fluid end expands said flex region to press an adjacent portion of said outward periphery of central section into said wall of said port in which said cover body is disposed; and said annular-shaped expansion groove has an inward end which is annular-shaped and defines a stress relief portion which in a section view along said central axis has an arcuately shaped terminal end wall.

16. The discharge valve keeper and plunger cover for use in the fluid end of the pump according to claim 15, wherein said annular-shaped expansion groove has an outward end which is annular-shaped and defines a fluid communication portion for transmitting fluid pressure within said pump chamber to said flex region of said cover body.

17. The discharge valve keeper and plunger cover for use in the fluid end of the pump according to claim 16, wherein said annular-shaped expansion groove is disposed in said flex region, and intermediate between said second seal groove and said outer end.

18. The discharge valve keeper and plunger cover for use in the fluid end of the pump according to claim 15, wherein said terminal end wall of said annular-shaped expansion groove is concave.

19. The discharge valve keeper and plunger cover for use in the fluid end of the pump according to claim 15, wherein an outermost sidewall of said annular-shaped expansion groove is formed at a twenty-two degree angle to said central axis.

20. The discharge valve keeper and plunger cover for use in the fluid end of the pump according to claim 15, wherein said cover body is formed of carburized steel.

* * * * *